Patented Apr. 6, 1954

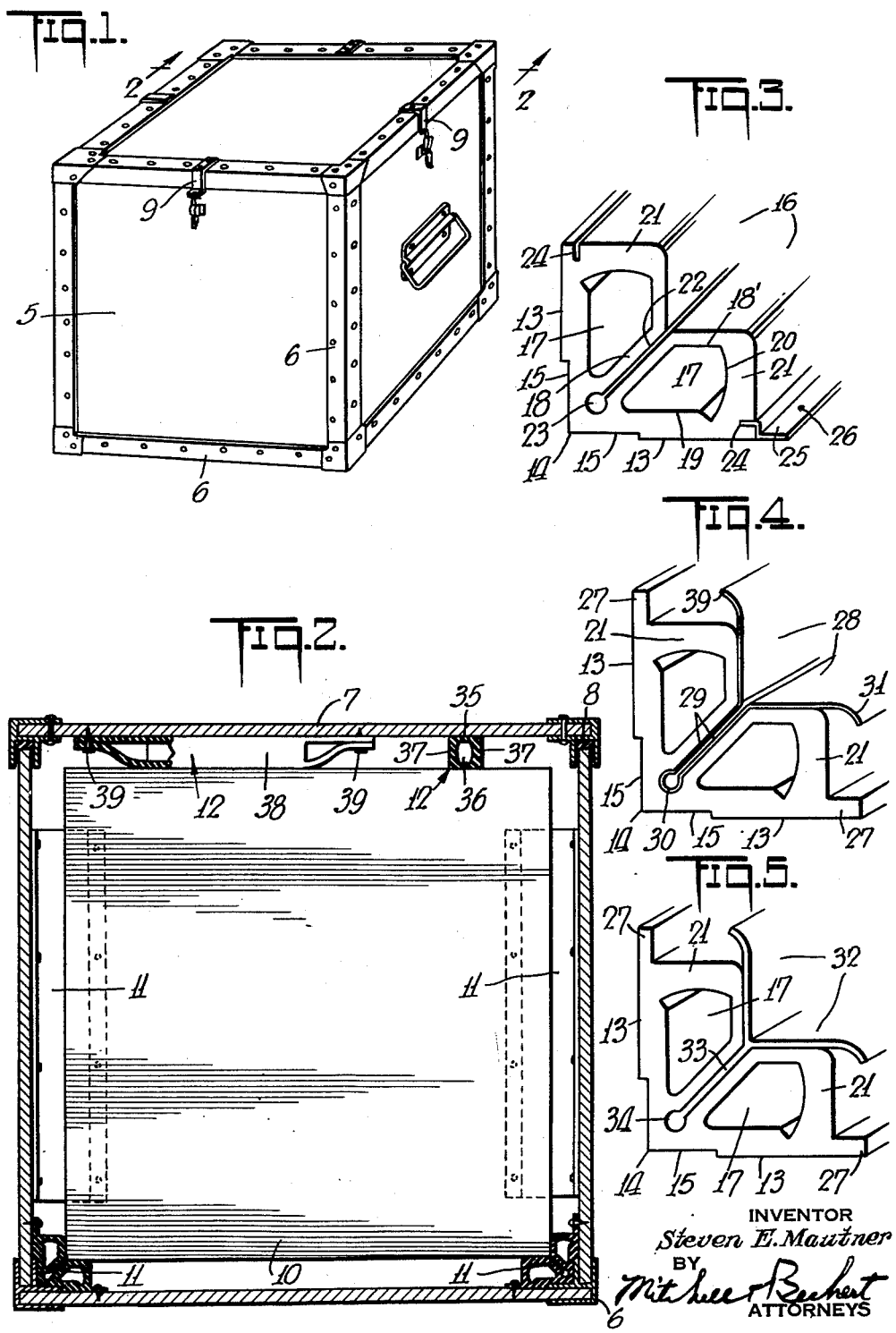

2,674,433

UNITED STATES PATENT OFFICE 2,674,433

SHOCK MOUNT

Steven Etienne Mautner, Port Jervis, N. Y., assignor to Skydyne, Inc., Port Jervis, N. Y., a corporation of New York Application July 21, 1950, Serial No. 175,048

7 Claims. (Cl. 248—358)

My invention relates to a shock mount, and more particularly to shock-mounting means to be secured on the inside of a transit case for sustaining electronic equipment and the like in the case against shock. Delicate equipment in a transit case is likely to be injured in a number of ways; for example, the transit case may be dropped from a substantial height, or the case may be bumped into or by another case or other object, and the case may be bounced about in a truck or other carrier. Electronic equipment and other delicate articles are often mounted on shock mountings inside the transit case to minimize the danger of injury in transit.

It is an object of my invention to provide an improved shock mount for cushioning articles in transit.

It is another object to provide an improved shock mount, which may be readily varied in its shock mounting capacity, depending upon the load to be sustained.

Another object is to provide an improved shock mount which, while having superior shock mounting characteristics, is cheap to manufacture, light, and very easy to apply.

Another object is to provide an improved shock mount which will facilitate the positioning of a delicate instrument on the shock-mounting equipment in a transit case.

It is another object to provide an improved shock mount, which may be mechanically fixed in a transit case, and which is not likely to come loose or slip in transit.

Other objects and various features of novelty and improvement will be hereinafter pointed out, or will become apparent to those skilled in the art.

In the drawings which show, for illustrative purposes only, preferred forms of the invention—

Fig. 1 is an exterior view in perspective of a transit case, in which the improved shock mount may be used;

Fig. 2 is a sectional view on an enlarged scale, taken substantially in the plane of the line 2—2 of Fig. 1, and illustrating improved shock mounts in place and sustaining an instrument case within the transit case;

Fig. 3 is an enlarged, fragmentary, perspective view of one form of shock mount;

Fig. 4 is a similar view, of a slightly modified form of shock mount, and illustrating one form of metallic liner equipment applied thereto;

Fig. 5 is a view similar to Fig. 4, but illustrating a modified form of metallic liner equipment.

The transit case 5 shown is formed of panels securely held in the metal corner members 6—6 so as to provide a very sturdy transit case capable of withstanding substantial abuse and rough handling. The case may be closed by a suitable lid 7, with a rubber gasket or the like 8 interposed between the top of the side panels and the metal channel forming part of the lid structure. Any suitable clasps 9—9 may be employed for securing the lid in place.

The article to be shock mounted, which in the present instance is represented as an instrument case 10, is somewhat smaller than the transit case 5, so that the walls of the shock-mounted object will be substantially spaced away from the walls of the transit case, and will be supported on shock mounts mounted in the transit case. The shock mounts 11—11 are mounted in the corners of the transit case 5, so as to sustain the packaged article 10 laterally as well as against downward motion. Between the top of the article 10 and the lid, I provide shock mounts 12—12 of different form. The improved lateral and bottom shock mounts, constituting the principal part of the invention, are shown enlarged and in alternative forms in Figs. 3, 4, and 5.

In the form shown in Fig. 3, the mount comprises a long strip of rubber having two outer sides 13—13 at substantially right angles to each other, and coming together at the corner 14, so that the shock mount may be mounted in the corner of the transit case, as shown particularly in Fig. 2. When the transit case is formed of panels and corner pieces, as shown at 6 in Figs. 1 and 2, and those channel members project outwardly from the panels, it is desirable to provide rabbets or recesses 15—15 in the outer rectangular surface of the shock mount, so that all parts of the shock mount will fit very accurately into the corner of the transit case. At the inside, the strip is formed with two surfaces 16—16 arranged respectively parallel to the surfaces 13—13, so as to form a substantially rectangular recess at the inside for receiving the corner of a shock-mounted article 10, as will be clear from Fig. 2. In order to save weight and cheapen the construction, and to provide a freer flowing of the material of which the shock mount is comprised, I preferably provide longitudinally extending recesses or cavities 17—17, which are defined by a diagonal member 18, extending from the outer corner to the bottom corner of the rectangular rabbet at the inside of the shock mount formed by the sides 16—16. Other defining surfaces for the cavity 17—17 may be walls 18' at the top, and walls 19 at the bottom, as well as a wall 20, which may be curved so as to provide a compression strut 21, which is designed to fold outwardly under stress and to sustain the major portion of the load applied by the shock-mounted case 10. The mount of Fig. 3 will be seen to be symmetrical about an axis through the diagonal web 18. In the preferred form, the web 18 is split, as indicated at 22, from the bottom corner of the rabbet to the point 23, which is well down toward the corner 14. The split diagonal web 18, therefore, makes each symmetrical half of the shock mount substantially independent of the other, so that downward pressure on the horizontal surface of the shock mount will be assumed principally by the vertical strut 21, and, to a lesser extent, by the other walls about the lower cavity 17. On the other hand, lateral pressure toward the left (Fig. 3) on the vertical wall 16 will be taken principally by the upper symmetrical half of the shock mount. Rubber shock mounts have heretofore been held in place by rubber cements, or by cementing or vulcanizing the rubber to a metallic part, which itself is secured inside the case. In the improved form shown, I prefer to provide longitudinally extending slots 24 along the outer marginal edges, so that holding members or brackets, such as generally Z-shaped metal plates 25, may engage within the slots 24, while the other portion of the bracket may be secured inside the case, as by means of rivets or nails 26. Thus, the mount may be securely held in place without the use of cements or vulcanizing, which bonds sometimes give under shear, and thus loosen the shock mounts.

In the form shown in Fig. 4, the shock mount is substantially the same as that shown in Fig. 3, except that in place of the securing slots 24 along the margin, there are preferably provided longitudinally extending, relatively thin flanges 27—27, which may be nailed, riveted, or otherwise secured to the walls of the transit case. In the form shown in Fig. 4, the slot 16 in the diagonal partition and the enlargement at the bottom of the slot serve to house metallic plate means, which in the form shown comprise two plates 28—28 at substantially right angles to each other, so as to fit on the surfaces 16—16, heretofore described. The plates 28—28 are preferably formed integrally with legs 29 terminating in the eye 30 secured in the bottom bore 23 in the shock mount. The plates 28—28 are in effect substantially independent of each other, so that pressure on either of the symmetrical halves of the mount will not very materially affect the other half. The plates are advantageous for several reasons, one being that the plates tend to distribute the load more evenly than when the shock-mounted case rests directly on the shock mount, as shown in Fig. 2. The outer edges of the plates 28—28 are preferably curved away, as shown at 31—31, so as to tend to guide the case 10 into position when the latter is placed in the transit case. Furthermore, the ends 31—31, turned as they are, will serve to permit a substantially free flow of the rubber, but will tend toward the extreme end of the flow to limit the rubber flow.

In the form shown in Fig. 5, the shock mount is substantially the same as that shown in Fig. 4, except that the metallic plate means is in the form of an aluminum or other extrusion section, in which the plates 32—32 are integral with each other and with the diagonal plate 33 and a bulbous end 34 held in the recess 23. The function of the plate means shown in Fig. 5 is substantially the same as that shown in Fig. 4, but since the plates 32—32 are integral with each other, the pressure on one plate sufficient to move it will also move the other plate, as distinguished from the construction in Fig. 4, where both plates are substantially independent of each other.

Between the lid and the case 10, I may employ another type 12 of shock mount. Such a shock mount may consist of a generally rectangular rubber strip 35, which may be recessed longitudinally, as shown at 36, so as to provide the two struts 37—37 for sustaining a vertical load. One strip 35 is shown in section in Fig. 2, while a correspondingly shaped strip 38 is shown at right angles to the strip 35, and both strips are secured to the lid 7. The method of securing the strips is preferably to split the struts 37—37 and bring the top and bottom plates, or flanges, together and secure the same as by means of nails, rivets, or the like 39, as will be understood.

It will be understood that I have provided an improved form of shock mount, which may be very readily installed, either by means of securing brackets, as shown in Fig. 3, or by means of nails or rivets through the flanges of Figs. 4 and 5, as shown in Fig. 2. When it is desired to give maximum support to the packaged article, the improved shock-mount strips may be as long as the corners into which they fit. On the other hand, when the loads to be sustained are relatively lighter, short sections of the shock-mount strip may be secured in the corners at suitable intervals so as to provide the support to the extent and where wanted. The outer sides of the rectangular rabbet formed by sides 16—16 on the inside of the strips are somewhat curved or flared, corresponding more or less to the curve or flare 37 of the metallic plates. Whether or not the plates are used, the shock mounts tend to guide the article 10 into place in the transit case. By properly positioning the shock mounts and making them of the proper length to sustain the expected loads, a very effective shock mount is provided.

In order to facilitate the insertion of the package 10, the upper ends of the shock mounts 11 in the vertical corners may be flattened down, for example as shown at 39, by cutting out parts of the struts 21 and bringing the walls 18' and 19 (Fig. 3) together. Thus, a tapering guide surface will be formed to guide the case 10 into place. Instead of flattening the ends of the shock mount strips 12 inside the cover as shown at 39—39, the walls next to the cover may be nailed thereto or both walls may be nailed to the cover and the nails driven in far enough to tend to bring the walls of the strip 12 together so that the nails will not strike the case 10.

The shock mounts are preferably formed of rubber or rubberlike material, or other resilient material, all of which materials are herein referred to in the claims merely as rubber. The improved shock mount strips are preferably made by the extrusion process rather than the more expensive casting or molding processes, and the rubber is preferably of relatively high density. The shock mounts are held in place by mechanical means, which are not likely to permit loosening of the shock mounts, and the mounts fit accurately in the corners, and the packed member 10, when inserted into the transit case, may be held quite firmly yet resiliently.

It will be seen that I have provided a very effective form of shock mount for minimizing or avoiding damage to delicate instruments and the like in a transit case.

While the invention has been described in considerable detail and preferred forms illustrated, it is to be understood that various changes may be made within the scope of the invention as defined in the appended claims.

I claim:

1. A shock mount formed of rubber and comprising a strip having two generally right angularly related outside walls and having two generally right angularly related inside walls forming a longitudinal rabbet at the inside, the inside walls being parallel to the respective outside walls of said strip, a diagonal wall connecting the outer corner of the strip and the inner corner of said rabbet and integral with both walls, and load bearing struts connecting the outer edges of the inside walls and the corresponding adjacent edges of the outside walls of said strip, said strip having two generally parallel longitudinal recesses at opposite sides of said diagonal wall and defining the inner surfaces of said inner and outer walls.

2. In the combination defined in claim 1, said diagonal wall having a longitudinally extending slot therein for the reception of a metallic means having parts to overlie the said load bearing struts.

3. In the combination defined in claim 1, said diagonal wall having a longitudinally extending slot therein, a metallic member having a longitudinally extending web to be held in said slot and having rectangularly extending plates to overlie said struts.

4. A shock mount formed of rubber and comprising a strip having two generally right angularly related outside walls to fit inside the corner of a packing case, said strip having two generally right angularly related inside walls forming a longitudinally extending rabbet at the inner side thereof for receiving the corner of a member to be shock mounted, the inside walls being generally parallel to the respective outside walls, a diagonal wall connecting the outer corner of the strip and the inner corner of said rabbet and integral with both walls, and metallic plate means to cover the sides of said rabbet, said diagonal wall having a slot to receive a part of said metallic means to secure the same to said strip, said strip having generally parallel longitudinal recesses defining said diagonal wall and the inner surfaces of the inside and outside walls.

5. In the combination defined in claim 4, said metallic plate means having securing means held in said strip.

6. In the combination defined in claim 4, said metallic plate means comprising separate plates to overstand each side of the rabbet so as to move substantially independently of each other when a deforming load is applied to one side of the rabbet and its corresponding plate.

7. A shock mount formed of rubber and comprising a strip having two generally right angularly related outside walls to fit in the corner of a packing case and having two generally right angularly related inside walls to form a generally right angular longitudinal recess at the inside to receive a corner of a member to be shock mounted, said outside and inside walls being generally respectively parallel to each other said strip having a pair of longitudinally extending recesses separated from each other by an integral diagonal wall extending between the outer and inner corners defined by said walls, and each recess being located between said corresponding parallel inside and outside walls.

References Cited in the file of this patent

UNITED STATES PATENTS

| Number | Name | Date |
|---|---|---|
| 276,882 | Roberts | May 1, 1883 |
| 380,219 | Roberts | May 27, 1888 |
| 599,172 | Gaines | Feb. 15, 1898 |
| 818,353 | Cole | Apr. 17, 1906 |
| 1,149,877 | Ward | Aug. 10, 1915 |
| 1,347,643 | Mallette | July 27, 1920 |
| 1,750,631 | Englesfield | Mar. 18, 1930 |
| 1,945,797 | Back et al. | Feb. 6, 1934 |
| 2,005,825 | Sheppard | June 25, 1935 |
| 2,017,917 | Nichols | Oct. 22, 1935 |
| 2,036,876 | Kraft | Apr. 7, 1936 |
| 2,057,346 | Reed | Oct. 13, 1936 |
| 2,103,678 | Kline et al. | Dec. 28, 1937 |
| 2,106,322 | Hornly | Jan. 25, 1938 |
| 2,140,844 | Mirus | Dec. 20, 1938 |
| 2,182,983 | Goldberg | Dec. 12, 1939 |
| 2,202,338 | Corizzo | May 28, 1940 |
| 2,272,884 | Zimmerman | Feb. 10, 1942 |
| 2,355,804 | Hutchinson | Aug. 15, 1944 |
| 2,376,530 | Dittmann | May 22, 1945 |
| 2,474,968 | Beach | July 5, 1949 |

FOREIGN PATENTS

| Number | Country | Date |
|---|---|---|
| 407,495 | Great Britain | Mar. 22, 1934 |